Jan. 1, 1924
J. P. CAREY
FLEXIBLE SHAFT COUPLING
Filed March 27, 1922
1,479,583
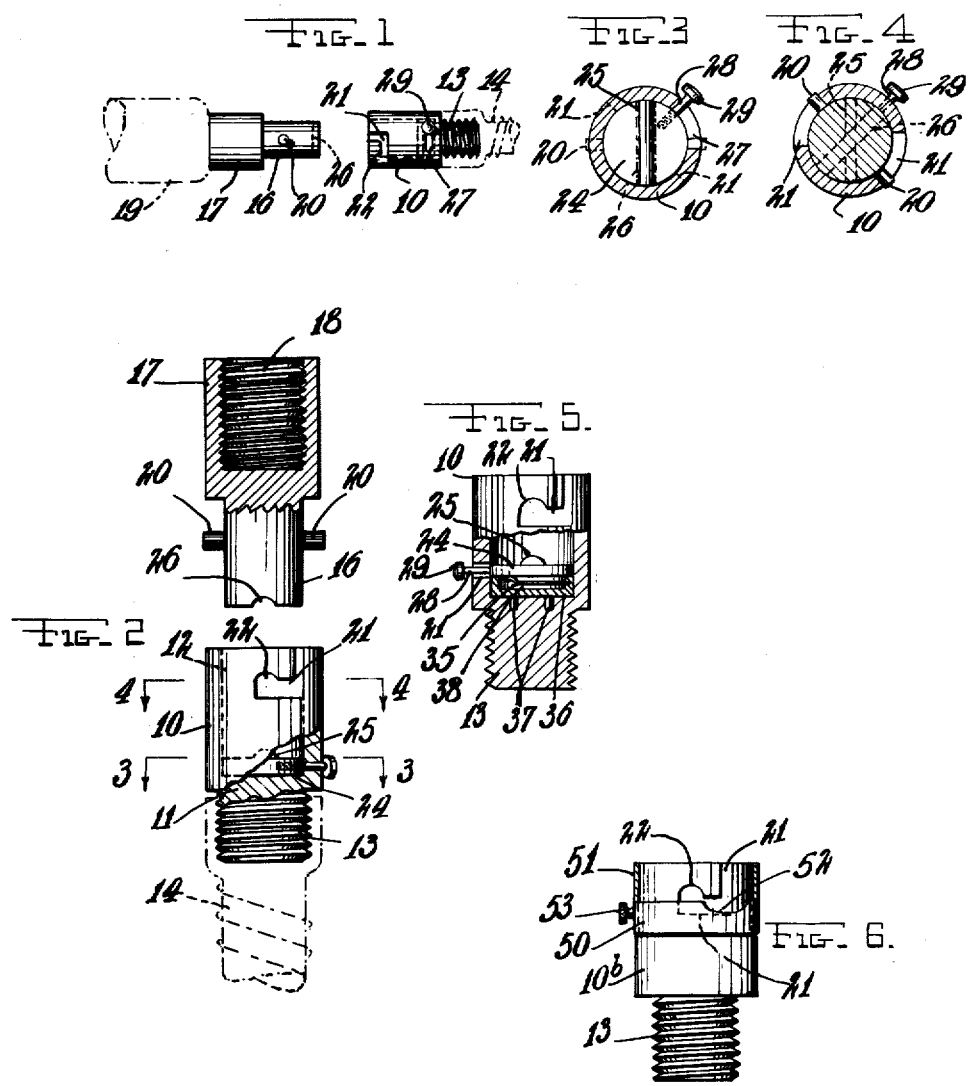
Inventor
James P. Carey Patented Jan. 1, 1924.

1,479,583

UNITED STATES PATENT OFFICE.

JAMES P. CAREY, OF NEW YORK, N. Y.

FLEXIBLE-SHAFT COUPLING.

Application filed March 27, 1922. Serial No. 547,299.

*To all whom it may concern:*

Be it known that I, JAMES P. CAREY, a citizen of the United States, residing at New York, in the county of New York and State of New York, have invented certain new and useful Improvements in Flexible-Shaft Couplings, of which the following is a specification.

This invention relates to couplings for flexible shafts such as are used for driving hair clippers, dental drills or like small implements requiring a variety of manipulation during use.

The invention has for a general object to provide a novel and improved type of shaft coupling for use as above specified.

Other specific objects of the invention relate to the provision of an improved shaft coupling characterized by simplicity of construction and by adaptability to ready engagement or disengagement of the two shaft sections by means of which the coupling is joined.

For further comprehension of the invention, and of the objects and advantages thereof, reference will be had to the following description and accompanying drawings, and to the appended claims in which the various novel features of the invention are more particularly set forth.

Fig. 1 of the drawings is a side view of my improved coupling, showing the two elements separated from one another.

Fig. 2 is a part side view and part axial sectional view of the coupling this view being on a larger scale than Fig. 1.

Fig. 3 is a transverse section on the line 3—3 of Fig. 2.

Fig. 4 is a transverse section on the line 4—4 of Fig. 2, but showing the parts in a different relation.

Fig. 5 is a part side elevation and part axial vertical section of a modified form of socket member.

Fig. 6 is a similar view of another modified form of socket member.

As here embodied my improved coupling comprises plug and socket members which are fixed on the respective shaft sections which are to be joined and which interlock with one another to secure the two shaft sections together. The socket member comprises a cylindrical body 10 open at one end and having its opposite end closed by an integral transverse wall 11, the socket recess being indicated at 12. Formed on the closed end of the socket member is an integral stud 13 which is exteriorly screw threaded as shown whereby the socket member is fixed to its shaft section, indicated at 14.

The plug member comprises the solid cylindrical plug proper 16 formed on one end of a larger body 17 in which is an interiorly screw threaded recess 18 whereby the plug member is fixed on its shaft section, indicated at 19. The plug 16 is of a diameter to fit snugly in the recess 12 and is locked in the socket by the following means: Projecting from opposite sides of the plug, 16, at a point between the ends thereof, are a pair of pins 20, which are adapted to pass through a pair of bayonet slots 21 formed in the socket body 10, the inner ends of these slots having offsets 22 which extend toward the open end of the socket and in which the pins 20 finally engage after passing through the slots 21. Seated rotatably in the bottom of the socket recess 12 is a disk 24 having a diametrically extending cam rib 25 on its outer face, while a complementary groove or recess 26 is formed on the end of the plug 16. Fixed to the disk 24 and projecting radially therefrom through an arcuate slot 27 in the socket wall is a stud 28 having a knob or head 29 on its outer end. The stud may be conveniently fixed to the disk 24 by screwing it into a tipped boring in the latter.

The manner in which my improved coupling operates is as follows: It may first be pointed out that the various parts are so constructed that when the stud 28 is at one end of slot 27, and the pins 20 in registry with the longitudinal arms of the bayonet slots 21, the rib 25 and groove 26 are likewise in registry with one another. Also that the end of plug 16 is in contact with the face of disk 24, with rib 25 engaging in groove 26, when the pins 20 are in registry with the circumferentially extending arms of the bayonet slots 21. To couple, then, the two sections of the shaft together the stud 29 is moved to the proper end of slot 27, and the plug 16 is inserted in the socket 12 until its end engages the disk 24, the rib 25 entering the recess 26. The disk and plug are then rotated together until the pins 20 register with the offsets 22 in the bayonet slots 21. The plug 16 is then moved outwardly to carry the pins 20 into the said offsets, and the disk 24 is then rotated to its original position. As will be apparent, this rotary movement of disk 24 causes the rib 25 to move out of its end to end registry with the groove 26 and extend at an angle to the latter, as indicated in Fig. 4, thus preventing disengaging of the pins 20 from the offsets 22 by inward movement of the plug. As will be apparent the engagement of the pins in the offsets locks the plug and socket members together as a rotative entity. The parts are uncoupled by reversing the above operations.

In the modification shown in Fig. 5 I provide resilient means urging the disk to the position occupied when the parts are locked. As here shown a spiral spring 35 is fixed at one end to the under side of the disk 24 and at its opposite end to a suitable part fixed in the socket body 10. For convenience in assembly this part is here in the form of a second disk 36 seating in the bottom of the socket and held against rotary movement by pins 37 engaging in the socket bottom wall, this disk 36 having its upper face recessed as at 38 to accommodate the spring 35.

Having thus described my invention what I claim as new and desire to protect by Letters Patent of the United States is as follows:

1. A coupling for flexible shafts comprising plug and socket members having interlocking parts, and a rotary element carried by the socket member and presenting a cam adapted to move the said interlocking parts into engagement with one another, said rotary element forming an abutment holding the said interlocking parts engaged with one another.

2. A coupling for flexible shafts comprising plug and socket members having interlocking parts, and a rotary disk seated in said socket member and providing a removable abutment engaging said plug member and holding said interlocking parts together, and a handle on said disk projecting through a slot in said socket member whereby said disk may be rotated.

3. A coupling for flexible shafts comprising plug and socket members adapted to be engaged and disengaged by axial movement of the plug member, and a rotary disk in said socket member for axially moving said plug member and forming an abutment holding said plug member in engaged position, said disk having a cam element formed thereon and adapted to impart axial movement to the plug member on rotary movement of the disk.

4. A coupling for flexible shafts comprising plug and socket members adapted to be engaged and disengaged by axial movement of the plug member, and a rotary disk in said socket member for axially moving said plug member, said plug member being formed on its inner end with a diametrically extending cam groove, and said disk having a complementary rib thereon adapted to be moved into or out of said groove to cause axial movement of the plug member.

In testimony whereof I have affixed my signature.

JAMES P. CAREY.